United States Patent [19]
Kim

[11] Patent Number: 6,164,517
[45] Date of Patent: Dec. 26, 2000

[54] SEAMLESS, RING-SHAPED BRAZING MATERIAL AND METHOD FOR PRODUCING SAME

[75] Inventor: Ki Hong Kim, 101-1002 A.P.T, Kum Yong, 39-54 YongHun, UijongBu, KyongGi, Rep. of Korea

[73] Assignees: Sun Kwang Brazing Filler Metal Co., Ltd.; Myoung Jin Kim; Ki Hong Kim, all of KyongGi, Rep. of Korea

[21] Appl. No.: 09/293,147

[22] Filed: Apr. 16, 1999

[30]  Foreign Application Priority Data

Oct. 19, 1998 [JP] Japan ................................. 10-296877

[51] Int. Cl.[7] .............................. B23K 1/20; B23K 37/06
[52] U.S. Cl. ................... 228/56.3; 228/223; 228/262.61; 228/262.51; 228/15.1
[58] Field of Search .................................... 228/56.3, 126, 228/131, 214, 223–262.1, 262.61–262.51, 5.1, 15.1–207, 208, 17.5; 219/85.1

[56]  References Cited

U.S. PATENT DOCUMENTS

| | | | |
|---|---|---|---|
| 3,610,663 | 10/1971 | Lago | 285/4 |
| 3,698,070 | 10/1972 | Sejournet et al. | 29/527 |
| 3,848,904 | 11/1974 | Anderson | 285/230 |
| 4,624,866 | 11/1986 | Cheng et al. | 427/190 |
| 5,504,296 | 4/1996 | Sato et al. | |
| 5,653,935 | 8/1997 | Hallstedt | 264/516 |
| 5,683,767 | 11/1997 | Shiraki et al. | 428/34.9 |
| 5,697,045 | 12/1997 | Osame et al. | |
| 5,778,714 | 7/1998 | Katsumura et al. | 72/97 |

FOREIGN PATENT DOCUMENTS

| | | |
|---|---|---|
| 0588545 | 3/1994 | European Pat. Off. . |
| 6304740 | 11/1994 | Japan . |
| 2504686 | 4/1996 | Japan . |
| 8108293 | 4/1996 | Japan . |
| 2584926 | 11/1996 | Japan . |

*Primary Examiner*—Patrick Ryan
*Assistant Examiner*—Jonathan Johnson
*Attorney, Agent, or Firm*—Browdy and Neimark

[57]  ABSTRACT

The seamless, ring-shaped brazing material comprises a brazing metal and a flux uniformly dispersed in the brazing metal for brazing nonferrous metal members and has a relative density of 0.90 or more. The seamless, ring-shaped brazing material is produced by (a) mixing brazing metal powder and flux powder uniformly; (b) pressing the resultant mixture to a powder compact billet; (c) forming the billet into a pipe by hot extrusion; and (d) slicing the pipe into rings.

15 Claims, 3 Drawing Sheets

SEAMLESS, RING-SHAPED BRAZING MATERIAL AND METHOD FOR PRODUCING SAME

BACKGROUND OF THE INVENTION

The present invention relates to a seamless, ring-shaped brazing material for brazing the same or different types of nonferrous metal members such as aluminum pipes, copper pipes, etc. and to a method for producing same.

Known as a method for achieving gas-tight contact of nonferrous metal members such as aluminum pipes is a method which comprises having a brazing alloy penetrate into a gap between contact surfaces of the metal members to be connected. Penetration by capillary effect occurs, when the brazing metal placed between or near the contact surfaces of the aluminum metal members is heated at a temperature equal to or higher than the melting point of the brazing alloy and lower than the melting point of aluminum. In general, it is desirable that the melting point of the brazing alloy is at least 30–40° C. lower than those of the metal members to be connected. Melting the brazing alloy is achieved, for instance, by heating in an inactive gas atmosphere, high-frequency heating, gas torching in the air, etc.

To remove oxides from the contact surfaces of the nonferrous metal members and increase the affinity of the nonferrous metal members for the brazing metal, a flux is applied to the contact surfaces of the nonferrous metal members. The flux is a substance, which is decomposed when melted at a brazing temperature, thereby reacting with the oxides on the contact surfaces of the metal members, resulting in their removal. Generally, the fluxes such as fluorinated potassium aluminates, chlorinated potassium aluminates, etc. are used for the brazing of aluminum.

Because many steps are needed to carry out brazing by applying a flux to a contact surface, placing a brazing material thereon and heating it by a torch, etc., the use of a so-called clad plate having a flux sandwiched by the brazing alloy was proposed to simplify the brazing process. Though the clad plate is effective for particular cases, for example, for the connection of metal members having complicated shapes, the clad plate is disadvantageous in that it is expensive. Further, because the brazing material is brought into contact with the entire surface of a substrate to be connected in the case of using the clad-type brazing material, the brazing material is likely to erode the substrate, resulting in the deformation of the substrate.

Also known is a brazing method comprising applying a paste which is a uniform mixture of brazing alloy powder and a flux powder in an organic solvent such as isopropyl alcohol to contact surfaces of metal members, drying the paste, and melting it by heating to connect both metal members. A proposed composition of the paste is a mixture of aluminum alloy powder, flux powder and a binder such as an acrylic resin in a solvent.

U.S. Pat. No. 3,971,501 discloses a brazing method comprising applying a mixture of brazing alloy powder and flux powder to surfaces of aluminum members to be connected and heating the aluminum surfaces to a brazing temperature after drying. U.S. Pat. No. 5,100,048 discloses a method comprising applying a composition of silicon metal powder and flux powder to contact surfaces of aluminum members to be connected and heating it so that an eutectic alloy is formed from the silicon metal powder and the aluminum member, thereby carrying out brazing. Though these methods are useful for connecting members having broad contact surfaces, they are disadvantageous in cases of connecting metal members having narrow contact surfaces such as pipes, because brazing materials are not sufficiently applied to the contact surfaces.

Recently proposed is the production of a rod-shaped, flux-containing brazing material by mixing of aluminum alloy powder and flux powder, hot-pressing the resultant mixture and forming it into an integral rod (Japanese Patent No. 2,584,926). However, the flux-containing brazing material is so brittle that it has difficulty in being bent into a ring.

WO 94/17941 discloses a method for producing a flux-coated aluminum alloy brazing material comprising ejecting a molten aluminum alloy by a gas atomization method or a rotating-disc method while spraying flux powder to the resultant brazing powder at the site of ejection. Coating the flux is done at the same moment when the brazing material is solidified. In this method, however, it is difficult to keep the combination ratio of the brazing alloy to the flux uniform and the compositions of products less variable.

In a case where metal pipe members such as aluminum pipes are connected by brazing with a composite brazing material comprising a brazing metal and a flux tuiformly dispersed therein, the composite brazing material should be formed into a ring. It has been found, however, that a brazing wire formed by the hot extrusion of a brazing metal and a flux is too brittle to be bent to a ring, and that a remaining stress due to bending causes the resultant ring to open during the heating for brazing. Also, since both ends of the ring tend to be first melted, it is difficult to achieve uniform brazing.

In the conventional brazing materials, a complex compound containing K, Al and F is used as a flux. The complex compound, however, is too expensive, because it is produced by melting and mixing a flux-forming material powder such as $AlF_3$ powder, KF powder, $Al_2O_3$ powder and CsF powder.

OBJECT AND SUMMARY OF THE INVENTION

Accordingly, an object of the present invention is to provide a seamless, ring-shaped brazing material composed of a uniform mixture of a brazing metal and a flux for eliminating the necessity of applying the flux, and capable of brazing the nonferrous metal pipe members without causing deformation and non-uniform melting.

Another object of the present invention is to provide a method for producing such a seamless, ring-shaped brazing material simply and inexpensively.

As a result of research in view of the above objects, the inventor has found that a seamless, ring-shaped brazing material uniformly containing a flux can be produced by pressing an uniform mixture of brazing metal powder and flux powder into a powder compact billet, forming the billet into a pipe by hot extrusion and slicing the pipe into a ring. The present invention has been completed based upon this finding.

The seamless, ring-shaped brazing material for brazing nonferrous metal members according to the present invention has a relative density of 0.90 or more, and contains a flux uniformly dispersed in the brazing metal.

The method for producing a seamless, ring-shaped brazing material having a relative density of 0.90 or more and containing a flux uniformly dispersed in a brazing metal for brazing nonferrous metal members according to the present invention comprises the steps of: (a) mixing brazing metal powder and flux powder uniformly; (b) pressing the resultant mixture to a powder compact billet; (c) forming the billet into a pipe by hot extrusion; and (d) slicing the pipe into rings.

DETAILED DESCRIPTION OF THE PREFERRED EMBODIMENTS

Figure 1A:
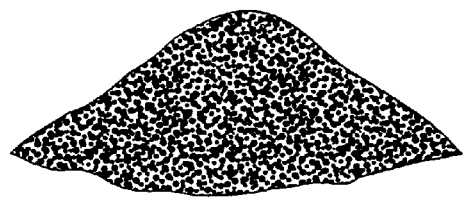
FIG. 1(a) is a schematic view illustrating mixed powder comprising brazing metal powder and flux powder used in the production of the seamless, ring-shaped brazing material according to the present invention.

[1] Starting Materials (1) Composition of Brazing Metal Powder

The composition of the brazing metal powder may be determined depending on the types of nonferrous metal members to be connected. In the present invention, any types of the brazing metal powder can be used as far as it is suitable for brazing. Suitably usable as brazing alloys for connecting, for example, two aluminum pipes, a copper pipe and an aluminum pipe, or two copper pipes are (i) aluminum alloys such as Al—Si alloys, Al—Si—Cu alloys, Al—Zn alloys, Al—Zn—Si alloys and Al—Si—Cu—Zn alloys, (ii) aluminum powder plus at least one alloying element powder selected from the group consisting of Si, Cu and Zn, and (iii) zinc alloys based on Zn and containing Al or Al and Si. The composition of the brazing metal powder may contain inevitable impurities and optionally metal additives for enhancing the brazability of the brazing metal powder.

(a) Aluminum Alloy Powder

In aluminum alloys such as Al—Si alloys and Al—Si—Cu alloys, the total content of alloying elements (Si and/or Cu) is preferably 5–15 weight %, more preferably 6–13 weight %. These alloying elements form flowable eutectic alloys with aluminum at a brazing temperature (about 600° C.), and these eutectic alloys cover contact surfaces of metal members to be connected. However, excess amounts of the alloying elements not only change the flowability of the eutectic alloys but also make the brazing material brittle. Specific examples of the brazing aluminum alloys include Al-5% Si-40% Zn alloys, Al-10% of Si-4% Cu-10% Zn alloys (by weight), etc.

(b) Aluminum Powder+Alloying Element Powder

In a case where a mixture of aluminum powder and alloying element powder is used instead of the aluminum alloy powder, a weight ratio of the alloying element powder (for example, Si) to the aluminum powder is preferably 5:100–15:100, more preferably 6:100–13:100. The alloying element powder, which is mixed with aluminum powder, is at least one metal powder selected from the group consisting of Si, Zn and Cu. Preferable among them is pure-metal Si powder.

(c) Aluminum-zinc alloy powder

Usable as the aluminum-zinc alloy powder is preferably Zn—Al alloy powder or Zn—Al—Si alloy powder. In the case of the Zn—Al alloy powder, the content of Zn is 5–95 weight % and that of Al is 95–5 weight %. In the case of the Zn—Al—Si alloy powder, the content of Zn is 5–85 weight %, that of Al is 10–94 weight % and that of Si is 1–5 weight %. Specific examples of the zinc-based, brazing aluminum-zinc alloys include Al—75% Zn alloys (by weight), etc.

(d) Average Diameter of the Brazing Metal Powder

In any cases of the above (i), (ii) and (iii), an average diameter of the brazing metal powder is preferably 200 μm or less, more preferably 10–150 μm. When the average diameter of the brazing metal powder is less than 10 μm, the brazing material powder is too expensive, and too much oxides are likely to be formed on the surface thereof. On the other hand, when the average diameter of the brazing metal powder is more than 200 μm, the brazing metal powder is too large to achieve uniform dispersion with the flux powder.

(e) Production Of Brazing Metal Powder

In any cases of (i), (ii) and (iii), the brazing metal powder can be produced by known procedures such as gas atomization, a rotating-disc method, a pulverization method, etc. In general, the gas atomization provides brazing metal powder with irregular shape, the rotating-disc method provides brazing metal powder with round shape, and the pulverization method provides brazing metal powder with irregular shape.

(2) Flux Powder

Preferably usable as the flux powder is a mixed powder of $AlF_3$ and at least one flux-forming material selected from the group consisting of KF, $Al_2O_3$ and CsF. The amount of $AlF_3$ is preferably 10–60 weight %, more preferably, 20–55 weight % based on the total amount of the flux powder. Particularly when a mixed powder of $AlF_3$ and KF is used, the weight ratio of the $AlF_3$ powder to the KF powder is preferably 60:40–40:60, more preferably 55:45–50:50. When a mixed powder of $AlF_3$ and CsF is used, the weight ratio of the $AlF_3$ powder to the CsF powder is preferably 10:90–55:45, more preferably this is 20:8–30:70.

Complex compounds of $AlF_3$, and at least one selected from the group consisting of KF, $Al_2O_3$ and CsF may be used as the flux powder. Also usable as the flux powder is a mixture of complex compound powder of $AlF_3$ and at least one selected from the group consisting of KF, $Al_2O_3$ and CsF, and the above-described flux-forming material powder. Preferable examples of the complex compounds include fluorinated compounds such as $KF-AlF_3$, $KAlF_4$, $K_2AlF_5$, $K_3AlF_6$ and $CsF-AlF_3$. The commercially available complex compounds include NOCOLOK (produced by ALCAN International Limited). The average diameter of the flux powder is preferably from a few microns to several tens of microns.

The amount of the flux powder (the total amount of flux-forming material powder and the complex compound powder when the complex compound powder is contained) is determined such that the weight ratio of the brazing metal powder to the flux powder is 95:5–70:30. When the weight ratio of the flux powder to the brazing material is less than 5 weight %, the contact surfaces of the metal members cannot sufficiently be made clean. On the other hand, even though it exceeds 30 weight %, further effects cannot be obtained, only resulting in the embrittlement of the brazing material. The more preferable weight ratio of the brazing metal powder to the flux powder is 90:10–70:30.

In the case of brazing by a torch, a weight ratio of the brazing metal powder to the flux powder may typically be 80:20. In the case of brazing in a furnace, a weight ratio of the brazing metal powder to the flux powder may typically be 85:15. In the case of brazing by high-frequency heating, a weight ratio of the brazing metal powder to the flux powder may typically be 90:10.

When the complex compound powder is added, the amount of the complex compound powder is preferably 5–30 weight %, more preferably, 10–25 weight % based on the flux-forming material powder.

[2] Production of Seamless, Ring-shaped Brazing Material

The method for producing a seamless, ring-shaped brazing material according to the present invention comprises the steps of: (a) mixing the brazing metal powder and the flux powder uniformly; (b) pressing the resultant mixture to a powder compact billet; (c) forming, the billet into a pipe by hot extrusion; and (d) slicing the pipe into rings. The production of the seamless, ring-shaped brazing material will be described below in the case of using the aluminum alloy powder, keeping in mind that the same is true of cases using other brazing metal powders.

(a) Mixing

The mixing of the aluminum alloy powder and the flux powder may be carried out by a ball mill, an attritor, etc. In particular, using the attritor, strong expanding force acts onto the aluminum alloy powder, whereby the aluminum alloy powder is remarkably deformed to enclose the flux powder.

(b) Pressing

A mixture of the aluminum alloy powder and the flux powder is pressed by a die having a desirable shape to form a powder compact billet. Though the conditions of the pressing may be variable depending on the types and compositions of the powders used, it is generally desirable to determine them such that the relative density of the powder compact billet is 0.6 or more. If the relative density of the powder compact billet is less than 0.6, the billet does not have enough mechanical strength, and a pipe formed from the billet by hot extrusion is likely to have pores. The preferable relative density of the powder compact billet is 0.70–0.95.

To obtain the powder compact billet with the above relative density, the press pressure is preferably 10–400 kgf/mm$^2$, more preferably 150–350 kgf/mm$^2$. The press temperature is preferably from room temperature to 200° C.

(c) Hot Extrusion

The powder compact billet is introduced into an extruder having a hot extrusion die at the tip, and heated to a temperature less than the decomposition point of the flux. The heating temperature is preferably 300–500° C. more preferably 350–500° C., specifically 400° C. The heated billet is hot-extruded through the die to form a pipe. The pipe may be not only in a cylindrical shape, but also in a prism or elliptical shape, etc. The hot extrusion pressure is determined such that the resultant pipe has a relative density of 0.90 or more. If the relative density of the pipe is less than 0.90, the pipe fails to have enough mechanical strength and provides brazing with poor quality. The preferable relative density of the pipe is 0.95 or more.

Incidentally, the shape of the extrudate is not limited to a pipe, and it can be in a shape of wire or plate or in a semi-circular or U-shaped cross section by changing the extrusion die.

(d) Slicing of Pipe

The hot-extruded pipe is sliced, for instance, by a cemented carbide disc blade, etc. to a predetermined length to form a seamless, ring-shaped brazing material. The slicing is generally carried out in a direction perpendicular to the axis of the pipe, though a little slanting is permitted.

(e) Secondary Forming

The seamless, ring-shaped brazing material may be subjected to secondary forming if necessary. For instance, cut surfaces perpendicular to the axis of the seamless, ring-shaped brazing material may be formed into curved surfaces. The secondary forming may be carried out by pressing the seamless, ring-shaped brazing material, while heating at 200–300° C.

Incidentally, when KF is used as the flux powder, it is desirable to carry out mixing, processes subsequent to the pressing and the storing of the products in a dry atmosphere, because KF is highly deliquescent.

[3] Use of Seamless, Ring-shaped Brazing Material

The brazing of a pair of aluminum pipes with the seamless, ring-shaped brazing material of the present invention will be described below. The seamless, ring-shaped brazing material is placed at the connection of the aluminum pipes, and heated by a torch, high frequency, an electric furnace, etc. The brazing time may be decided such that the aluminum alloy melts and penetrates into a gap between the contact surfaces of both aluminum pipes sufficiently. For example, in the case of brazing aluminum pipes having an outer diameter of 8 mm and a thickness of 0.6–1.0 mm, the brazing time is about 10 seconds to 1 minute for a torch burner and about 4–5 seconds for high frequency heating. The brazing temperature is equal to or higher than the melting points of the aluminum alloy powder and the flux powder and lower than the melting point of the aluminum pipes, generally about 450–620° C. The particularly preferable brazing temperature is about 570–620° C. in the case of the seamless, ring-shaped brazing material comprising Al—Si alloys.

The present invention will be described in detail referring to the following without intention of limiting the present invention thereto.

EXAMPLES 1–3

(1) Production of Seamless, Ring-shaped Brazing Materials

Figure 1B:
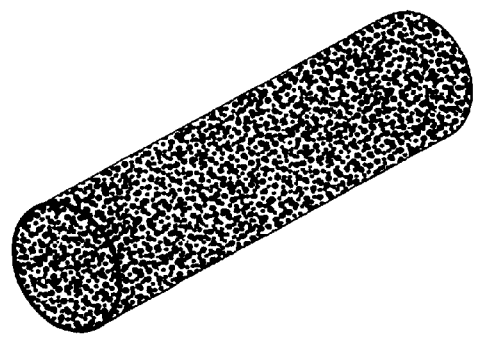
FIG. 1(b) is a schematic view illustrating a powder compact billet formed from the mixed powder.

AlF$_3$ powder and KF powder were mixed at a weight ratio of 54:46, and then uniformly mixed with Al-10 weight % Si brazing alloy powder having an average diameter of 70 μm (see FIG. 1(a)). The weight ratio of the Al-10 weight % Si brazing alloy powder to the flux-forming material powder (AlF$_3$ powder+KF powder) was 80:20. The resultant mixed powder was pressed at 200 kgf/mm$^2$ and at room temperature into a powder compact billet of 75 mm in diameter and 250 mm in length (see FIG. 1(b)).

Figure 1C:
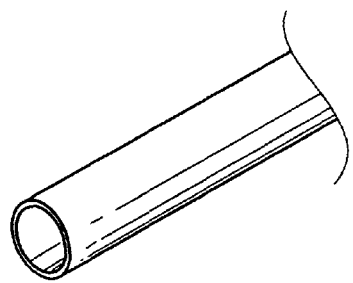
FIG. 1(c) is a schematic view illustrating a pipe formed from the powder compact billet by hot extrusion.

The billet was heated to 400° C. by a reducing atmosphere burner, and hot-extruded by a hydraulic extruder with a two-port, hollow die to form pipes having various sized shown in Table 1 (see FIG. 1(c)). The hot extrusion was carried out at a pressure of 500 tons and at an extrusion speed of 10 m/minute. Each of the resultant pipes had a relative density of 0.96.

TABLE 1

| | Size of Pipe (mm) | | | |
|---|---|---|---|---|
| Example No. | Outer Diameter | Inner Diameter | Thickness | Length |
| 1 | 11.3 | 8.2 | 1.55 | 500 |
| 2 | 15.8 | 12.7 | 1.55 | 500 |
| 3 | 19.3 | 16.0 | 1.65 | 500 |

Figure 1D:
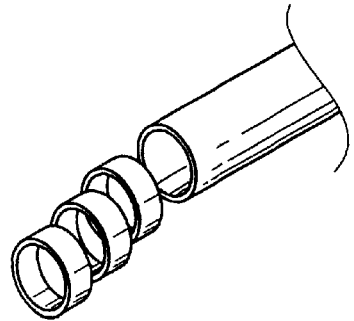
FIG. 1(d) is a schematic view illustrating a seamless, ring-shaped brazing material produced by slicing the pipe.

The pipes were set on a slicing equipment to be cut with a cemented carbide disc blade having a thickness of 0.5 mm to provide seamless, ring-shaped brazing materials of 1.6 mm in width (see FIG. 1(d)).

(2) Use of Seamless, Ring-shaped Brazing Material

Figure 2A:
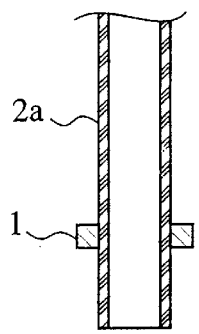
FIG. 2(a) is a cross-sectional view illustrating aluminum pipes to be lap-jointed.
Figure 2A:
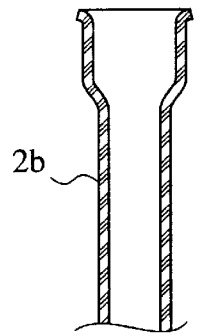
Figure 2B:
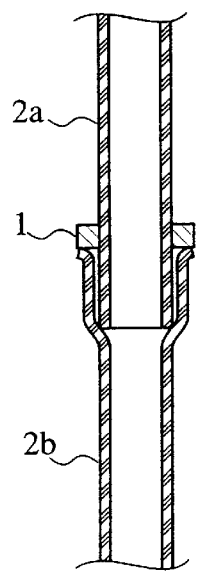
FIG. 2(b) is a cross-sectional view illustrating aluminum pipes connected for brazing.

A 10-mm-long end portion of the first aluminum pipe 2b of 8.0 mm in outer diameter and 6.4 mm in inner diameter was expanded and a tip end portion thereof was flared (see FIG. 2(a)). After inserting the second aluminum pipe 2a having the same diameter as that of the first pipe 2b into a seamless, ring-shaped brazing material 1 of Example 1, the second pipe 2a was inserted into the flared end of the first pipe 2b, so that a lap joint was provided between two pipes 2a and 2b with a gap of about 0.1 mm (see FIG. 2(b)).

Figure 2C:
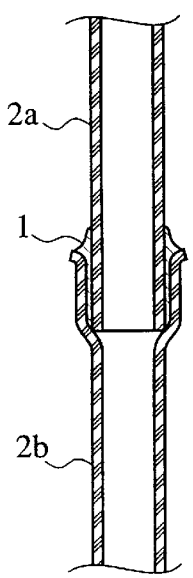
FIG. 2(c) is a cross-sectional view illustrating aluminum pipes lap-jointed by brazing.

The connection of these aluminum pipes 2a and 2b provided with the seamless, ring-shaped brazing material 1 was heated at 600° C. for 15 seconds in the air to completely melt the brazing material 1, resulting in the penetration of the brazing material 1 into a gap between both pipes 2a and 2b (see FIG. 2(c)). The compressed air at 10 kgf/cm² was forced into the brazed aluminum pipes 2a, 2b which were then completely soaked in water to check the gas-tightness of the brazed aluminum pipes 2a, 2b. As a result, no leakage was observed at their connection.

REFERENCE EXAMPLE 1

Figure 3:
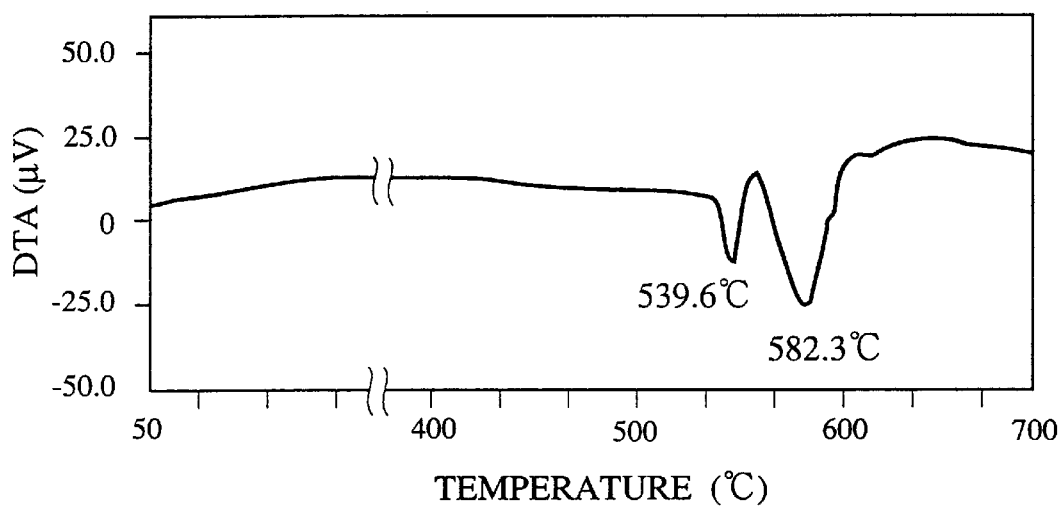
FIG. 3 is a graph showing the differential thermal analysis data in REFERENCE EXAMPLE 1.

A flux-containing, ring-shaped brazing material was produced from an aluminum alloy having a composition of Al-10.5 weight % Si (4045) and a flux of KAlF$_4$ having a composition of 32 weight % of K, 17 weight % of Al and 51 weight % of F in the same manner as in EXAMPLE 1. The resultant flux-containing, ring-shaped brazing material was subjected to a differential thermal analysis (DTA). The results are shown in FIG. 3.

COMPARATIVE EXAMPLE 1

A brazing wire made of an Al-10 weight % Si alloy having a diameter of 1.6 mm was bent to a brazing alloy ring with a small gap (hereinafter referred to as "gapped brazing alloy ring") having an inner diameter of 8.2 mm. The same aluminum pipes as in Example 1 were connected by brazing using this gapped brazing alloy ring and a commercially available flux suspension (NOCOLOK, available from ALCAN International Limited).

After applying the flux to the contact surfaces of the aluminum pipes, the gapped brazing alloy ring was disposed at the connection of the aluminum pipes, which was then heated in the air. As a result, the gapped brazing alloy ring was opened at 300° C. Also when heated at 570° C., the ends of the gapped ring were first melted into a spherical shape, making it unlikely to achieve satisfactory brazing.

COMPARATIVE EXAMPLE 2

The powder compact billet produced in Example 1 was charged into a hydraulic extruder with a wire-drawing die to form a flux-containing brazing wire having a diameter of 2.0 mm at 450° C., at an extrusion speed of 20 m/minute under a pressure of 500 tons. Attempts were made to form this brazing material ring into a ring having an inner diameter of 10–20 mm while heating at 200–300° C., merely leading to brittle fracture and breakage in most brazing wires.

EXAMPLE 4

Brazing metal powder consisting of Al powder (average diameter: 30 μm) and Zn powder (average diameter: 20 μm) at a weight ratio of 25:75 was uniformly mixed with a flux powder consisting of AlF$_3$ powder and Cs powder at a weight ratio of 52:48, at a weight ratio of 70:30. The resultant mixed powder was pressed at a pressure of 200 kgf/mm² at room temperature to form a powder compact billet of 75 mm in diameter and 250 mm in length.

With the same hydraulic extruder with a 2-port, hollow die as in Example 1, the resultant powder compact billet was hot-extruded at a pressure of 500 tons and at an extrusion speed of 40 m/minute at the same temperature as in Example 1, to form a pipe of 11.3 mm in outer diameter, 8.2 mm in inner diameter, 1.55 mm in thickness and 500 mm in length. The resultant pipe had a relative density of 0.96. This pipe was set in a cutter and sliced by a cemented carbide disc blade having a thickness of 0.5 mm to obtain a seamless, ring-shaped brazing material of 1.6 mm in width.

With this seamless, ring-shaped brazing material, the aluminum pipes were brazed in the same manner as in Example 1 except for a heating temperature of 500° C. and a heating time of 10 seconds. The compressed air at 10 kgf/cm² was forced into the brazed aluminum pipes, which were then completely soaked in water to check the gas-tightness of the brazed aluminum pipes. As a result, no leakage was observed at their connection.

EXAMPLE 5

With the same mixture of brazing metal powder and flux powder as in Example 1, seamless, ring-shaped brazing materials having various sizes shown in Table 2 below were produced to braze aluminum pipes having various sizes shown in Table 2. The same leak test as in Example 1 was carried out on each brazed sample. The results are also shown in Table 2.

TABLE 2

(Unit: mm)

| Sample No. | Seamless, Ring-Shaped Brazing Material | | | | Aluminum Pipe | |
|---|---|---|---|---|---|---|
| | Outer Diameter | Inner Diameter | Thickness | Width | Outer Diameter | Leak |
| 1 | 11.2 | 8.2 | 1.5 | 2.0 | 8.0 | No |
| 2 | 12.7 | 9.7 | 1.5 | 2.0 | 9.5 | No |
| 3 | 15.7 | 12.7 | 1.5 | 2.5 | 12.7 | No |
| 4 | 19.0 | 16.0 | 1.5 | 2.5 | 15.9 | No |
| 5 | 19.2 | 16.2 | 1.5 | 2.5 | 15.9 | No |

As described above, the seamless, ring-shaped brazing material of the present invention containing a flux uniformly does not require the application of the flux for brazing, making the entire brazing process efficient. Further, the seamless structure of the ring-shaped brazing material not only makes it unnecessary to carry out a difficult step of forming a brazing wire to a ring, but also eliminates the likelihood that a ring-shaped brazing wire is opened while heating for the brazing. In addition, the brazing of nonferrous metal members can be carried out rapidly and stably with the seamless, ring-shaped brazing material of the present invention, best suited for automation.

Because the flux-forming material powder is used as the flux powder, the production process can be simplified, leading, to low production cost.

The seamless, ring-shaped brazing material of the present it invention having such advantages is useful for brazing the nonferrous metal members such as those made of aluminum and/or copper.

What is claimed is:

1. A brazing material comprising a brazing metal and a flux uniformly dispersed in said brazing metal for brazing nonferrous metal members and having a relative density of 0.90 or more, said brazing material having a seamless ring-shape with cut opposite edges, said brazing material being formed by slicing a hot-extruded pipe composed of a uniform mixture of said brazing metal and said flux.

2. The seamless, ring-shaped brazing material according to claim 1, wherein a weight ratio of said brazing metal to said flux is 95:5–70:30.

3. The seamless, ring-shaped brazing material according to claim 2, wherein said brazing metal is at least one aluminum alloy selected from the group consisting of Al—Si alloys, Al—Si—Cu alloys, Al—Zn alloys, Al—Zn—Si alloys and Al—Si—Cu—Zn alloys.

4. The seamless, ring-shaped brazing material according to claim 1, wherein said flux is a mixture of $AlF_3$ and at least one flux-forming material selected from the group consisting of KF, $Al_2O_3$ and CsF.

5. The seamless, ring-shaped brazing material according to claim 1, wherein said nonferrous metal members are made of aluminum and/or copper.

6. A method for producing a seamless, ring-shaped brazing material comprising a brazing metal and a flux uniformly dispersed in said brazing metal for brazing nonferrous metal members and having a relative density of 0.90 or more, said method comprising:

(a) mixing brazing metal powder and flux powder uniformly;

(b) pressing the resultant mixture to a powder compact billet;

(c) forming said billet into a pipe by hot extrusion at a temperature less than the decomposition point of said flux; and (d) slicing said pipe into rings.

7. The method according to claim 6, wherein said hot extrusion is carried out at 300–500° C.

8. The method according to claim 6, wherein said pressing is carried out at a pressure of 10–400 $kgf/mm^2$ and at a temperature between room temperature and 200° C.

9. The method according to claim 6, wherein said brazing metal powder is aluminum alloy powder or a mixed powder comprising an aluminum powder and at least one metal powder selected from the group consisting of Si, Cu and Zn.

10. The method according to claim 6, wherein said flux powder is a mixture of $AlF_3$ powder and at least one flux-forming material powder selected from the group consisting of KF powder, $Al_2O_3$ powder and CsF powder.

11. The method according to claim 10, wherein a weight ratio of $AlF_3$ powder to KF powder is 60:40–40:60.

12. The method according to claim 10, wherein said flux powder further contains a complex compound powder comprising K, Al and F.

13. The method according to claim 12, wherein said complex compound is 5–30 parts by weight per 100 parts by weight of the mixture of $AlF_3$ powder and at least one flux-forming material powder selected from the group consisting of KF powder, $Al_2O_3$ powder and CsF.

14. The method according to claim 6, wherein said brazing metal is at least one aluminum alloy selected from the group consisting of Al—Si alloys, Al—Si—Cu alloys, Al—Zn alloys, Al—Zn—Si alloys and Al—Si—Cu—Zn alloys.

15. The method according to claim 6, wherein said nonferrous metal members are made of aluminum and/or copper.

* * * * *